US008396179B2

United States Patent
Van Houdt et al.

(10) Patent No.: US 8,396,179 B2
(45) Date of Patent: Mar. 12, 2013

(54) FRAME SYNCHRONIZING DEVICE AND METHOD

(75) Inventors: Marko Van Houdt, Nijmegen (NL); Johannes Petrus Antonius Frambach, Nijmegen (NL)

(73) Assignee: NXP B.V., Eindhoven (NL)

( * ) Notice: Subject to any disclaimer, the term of this patent is extended or adjusted under 35 U.S.C. 154(b) by 2085 days.

(21) Appl. No.: 10/538,576

(22) PCT Filed: Nov. 18, 2003

(86) PCT No.: PCT/IB03/05364
§ 371 (c)(1),
(2), (4) Date: Jun. 15, 2005

(87) PCT Pub. No.: WO2004/057782
PCT Pub. Date: Jul. 8, 2004

(65) Prior Publication Data
US 2006/0050819 A1    Mar. 9, 2006

(30) Foreign Application Priority Data

Dec. 19, 2002    (EP) .................... 02080381

(51) Int. Cl.
*H04L 7/04* (2006.01)
*H04J 3/06* (2006.01)
(52) U.S. Cl. .................. 375/365; 375/371; 370/516
(58) Field of Classification Search .............. 375/354, 375/362, 371, 364–368; 370/503, 509–514, 370/516
See application file for complete search history.

(56) References Cited

U.S. PATENT DOCUMENTS

| 3,909,724 | A | * | 9/1975 | Spoth et al. ................... 375/368 |
| 4,214,124 | A | * | 7/1980 | Jarus ............................. 375/365 |
| 4,675,886 | A | | 6/1987 | Surie |
| 4,744,081 | A | * | 5/1988 | Buckland ....................... 370/514 |
| 5,005,191 | A | * | 4/1991 | O'Connor et al. ............. 375/368 |
| 5,010,559 | A | * | 4/1991 | O'Connor et al. ............. 375/368 |
| 5,367,544 | A | * | 11/1994 | Bruekheimer ................ 375/368 |
| 5,442,636 | A | | 8/1995 | Bontekoe |
| 6,104,770 | A | * | 8/2000 | Yama ............................. 375/368 |
| 7,035,292 | B1 | * | 4/2006 | Giorgetta et al. ............. 370/509 |

FOREIGN PATENT DOCUMENTS

| EP | 0 397 142 A1 | 11/1990 |
| EP | 0397142 | 11/1990 |
| EP | 0 535 768 A2 | 4/1993 |
| EP | 0535768 | 4/1993 |
| EP | 0 659 001 A2 | 6/1995 |
| EP | 0659001 | 6/1995 |
| WO | WO 00 77960 | 12/2000 |
| WO | WO 00/77960 A1 | 12/2000 |

* cited by examiner

*Primary Examiner* — Tesfaldet Bocure

(57) ABSTRACT

Disclosed is a frame synchronizing device and method for a binary data transmission system wherein digital data are transmitted as a serial bit stream organized into frames, each frame including a pre-defined frameheader, wherein said serial bit stream is inputted into a serial input portion of a serial input parallel output shift register means having at least as many stages as the number of bits of a frame, and said frames are outputted in a consecutive order from a parallel output portion of said shift register means. The particularity of the present invention is that it is detected whether or not a frameheader is present in the output of said parallel output portion, and, if not, the outputting of a frame from said parallel output portion is delayed by at least one time period which is needed for shifting a bit in said serial input portion from a stage to a next one, until synchronization is reached.

15 Claims, 4 Drawing Sheets

FRAME SYNCHRONIZING DEVICE AND METHOD

The present invention relates to a frame synchronizing device for a binary data transmission system wherein digital data are transmitted as a serial bit stream organized into frames, each frame including a predefined frameheader, comprising a serial input parallel output shift register means for receiving said serial bit stream and outputting said frames in a consecutive order, said shift register means including a serial input portion and a parallel output portion and having at least as many stages as the number of bits of a frame. Further, the present invention relates to a frame synchronizing method for a binary data transmission system wherein digital data are transmitted as a serial bit stream organized into frames, each frame including a pre-defined frameheader, comprising the steps of inputting said serial bit stream into a serial input portion of a serial input parallel output shift register means having at least as many stages as the number of bits of a frame, and outputting said frames in a consecutive order from a parallel output portion of said shift register means.

Such a device and such a method is used in a digital data transmission systems like SDH (Synchronous Digital Hierarchy)/SONET (Synchronous Optical Network) or Gigabit Ethernet and in particular in the networking part of such a system, where serial data are transported over a single channel and, at the receiving side, converted into parallel data for further processing.

In digital data transmission systems like SDH/SONET or Gigabit Ethernet, data at the transmitting side is sent byte after byte, forming an endless stream of bits in serial order, wherein a byte is a word of ones and zeroes of fixed, but unimportant, length. When this sequence of bits has to be byte demultiplexed at the receiving side, it is crucial to know the position of the original bytes in this stream of bits. A transmission overhead gives the possibility to do so, by inserting one ore more special byte(s) at the transmit side, also known as frameheader bytes (SDH/SONET) or comma byte (Gigabit Ethernet). However, the time moments of occurrence of this special byte is unknown at the receiving side so that special measures are required to recognize this special byte at the receiving side. When this special byte is recognized in the stream of bits at the receiving side, the moment of demultiplexing is known and the demultiplexed parallel output data can be aligned to the byte boundaries.

To be able to recognize the special byte at the receiving side, frameheader detection or comma byte detection is necessary and a resetable clock-divide-by-N counter must be synchronized to the frameheader byte position. This clock-divided-by-N output signal determines the moment when the demultiplexing occurs. The synchronization of this synchronous resetable clock-divide-by-N counter, when the special byte is detected, must be done at full operation speed in an exactly known time interval.

U.S. Pat. No. 4,675,886 discloses a frame synchronization device which utilizes a frame alignment word decoder connected to the outputs of a shift register which receives at its input the received data bit stream. It is clocked by a clock signal generated from a selection of periods of the data bit stream timing signal reproducing a periodic pattern. This pattern is formed by relative bit locations within the duration of a frame certain at least of which are distributed according to the distribution of the bits of an alignment word in a frame and which form groups of the same size regularly distributed over the duration of a frame. This clock signal is generated in the device by a divider which divides by 20 or by 21 which imposes on it a periodic phase skip by the value of one period of the data bit stream timing for as long as the alignment word is not recognized by the decoder. The shift register is implemented in two parallel parts clocked by versions of the clock signal with a relative phase shift between them, one of which parts updates the other part in parallel on each phase skip of the clock signal.

U.S. Pat. No. 5,442,636 describes a frame aligner circuit for aligning a plurality of information packet signals received within a maximum starting time variation interval, which circuit consists of a plurality of frame detectors, stretch circuits and variable delay circuits which are controlled by a synchronization signal generator and a delay control circuit. The delay control circuit in one embodiment of the present invention delays each information packet signal for a duration of time defined by the start of the information packet signal and an interval of time following the start of a last received information packet signals. In this manner, each information packet signal is delayed by a corresponding period of time to align the plurality of information packet signals with respect to one another.

WO 00/77960 discloses a method and a device for converting virtually concatenated data streams into contiguously concatenated data streams. The data are transmitted in containers, and N containers are combined in one multiframe. The virtually concatenated data streams consist of X partial streams/channels. Every container that is allocated to the same location in the multiframe is identified by evaluating a multiframe indicator of the container. The time-shift of said identified containers of the partial data streams with respect to one another is measured. If such a time-shift is detected, only the leading containers are delayed in such a manner that a time-wise alignment of all containers is achieved. Every channel is correlated with a pointer interpreter, followed by an flexible memory and a pointer generator. The pointer generators are inter-synchronized, and every pointer generator is equipped to control the read-out of the flexible memory that pertains to its channel. A channel selected as the master channel is provided with an overhead inserter.

It is an object of the present invention to improve the efficiency of the frame synchronization and in particular to achieve a low power dissipation.

In order to achieve the above and further objects, according to a first aspect of the present invention, there is provided a frame synchronizing device for a binary data transmission system wherein digital data are transmitted as a serial bit stream organized into frames, each frame including a pre-defined frameheader, comprising a serial input parallel output shift register means for receiving said serial bit stream and outputting said frames in a consecutive order, said shift register means including a serial input portion and a parallel output portion and having at least as many stages as the number of bits of a frame, characterized by controlling means for detecting whether or not a frameheader is present at the output of said parallel output portion and, if not, controlling said shift register means so that the outputting of a frame from said parallel output portion is delayed by at least one time period which is needed for shifting a bit in said serial input portion from a stage to a next one, until synchronization is reached.

According to a second aspect of the present invention, there is provided a frame synchronizing method for a binary data transmission system wherein digital data are transmitted as a serial bit stream organized into frames, each frame including a pre-defined frameheader, comprising the steps of inputting said serial bit stream into a serial input portion of a serial input parallel output shift register means having at least as many stages as the number of bits of a frame, and outputting said frames in a consecutive order from a parallel output portion of said shift register means, characterized by the further steps of detecting whether or not a frameheader is present in the output of said parallel output portion, and, if not, delaying the outputting of a frame from said parallel output portion by at least one time period which is needed for shifting a bit in said serial input portion from a stage to a next one, until synchronization is reached.

According to the present invention, the outputting of a frame from the parallel output portion of the shift register is held for at least one high frequency cycle, and the moment of demultiplexing of the bit stream is skipped or "kicked" at least one bit. Namely, the demultiplexed parallel data outputted from the parallel output portion of the shift register means is fed to the controlling means which searches for the frame header. If the frame header is not found within a certain time, the demultiplexing is skipped at least one clock-cycle and consequently continued at least one bit later. This procedure is repeated until the frame header is detected in the parallel data. If it is detected, the system is synchronized. When the system has reached synchronization, meaning that the demultiplexed parallel output data is aligned to the byte boundaries, nothing happens anymore. Only when synchronization is lost again (e.g. due to external circumstances), the re-synchronization procedure will start over again.

A main advantage of the present invention is that the synchronization is done in the parallel clock domain having lower frequency and less dissipating or even by external sources like overall transmission system controllers. So, the synchronization according to the present invention can be implemented in a circuitry using low frequency driving signals, like CMOS.

It is noted that the term "frame" used herein means every kind of frame, word, byte etc. and that the term "frameheader" used herein means kind of special byte like e.g. frameheader byte (SDH/SONET) or, byte (Gigabit Ethernet).

Further advantageous embodiments of the present invention are defined in the dependent claims.

In particular, the delaying of the outputting of a frame may be repeated several times until synchronization is reached.

Usually, the frames have a fixed length, and, preferably, consist of bytes.

In a further embodiment wherein first clock pulses are generated which clock the outputting of the frames from the parallel output portion of the shift register means, the first clock pulses are delayed by at least one time period which is needed for shifting a bit in the serial input portion from a stage to a next one. So, the first clock pulses which may also be called output clock pulses are skipped by at least one clock pulse until synchronization is reached.

Usually, second clock pulses for clocking the inputting of the serial bit stream into the serial input portion of the shift register means are generated and converted into said first clock pulses having a time period which is N times longer than the time period of the second clock pulses, wherein each frame includes N bits, so that the first clock pulses are delayed by at least one time period of said second clock pulses.

In a still further embodiment of the present invention, a ("kick-pin") control signal is generated, if a frameheader is not detected in the output of the parallel output portion of the shift register means, wherein the generation of the first clock pulses is blocked by said control signal for at least one time period which is needed for shifting a bit in the serial input portion of the shift register means from a stage to a next one. So, such "kick-pin" signal determines skipping the first clock pulse until synchronization is reached.

The above described objects and other aspects of the present invention will be better understood by the following description and the accompanying figures, in which:

FIG. 1 schematically shows the waveforms of the data bit signals at the transmitting side and at the receiving side;

FIG. 2 schematically shows the waveforms of the data bit signals at the transmitting side and at the receiving side including a frame header byte drawn as a shaded portion;

Figure 4:
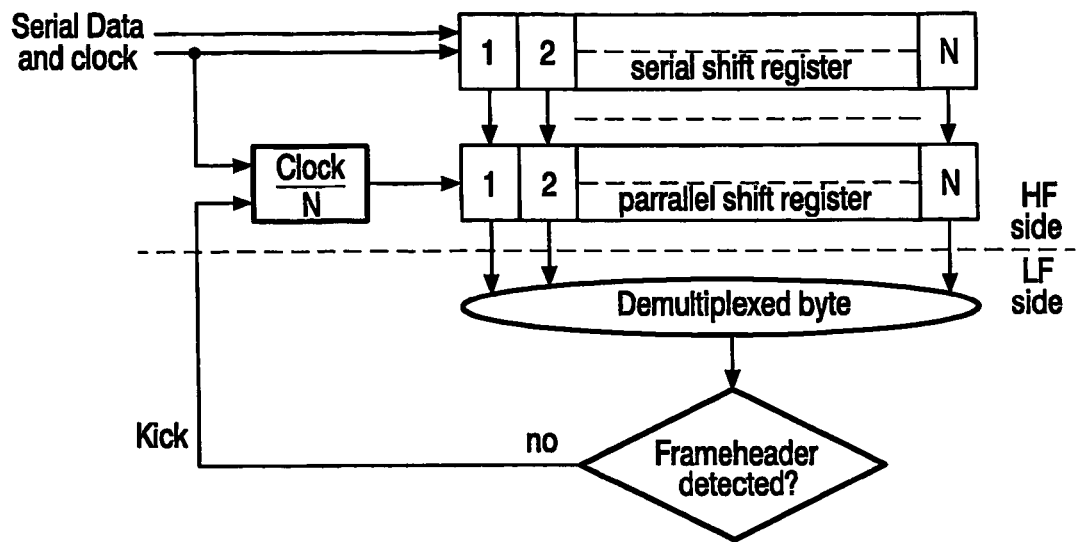
FIG. 4 shows a schematic block diagram of a frame synchronizing device comprising a serial input parallel output shift register according to a preferred embodiment of the present invention.
Figure 5:
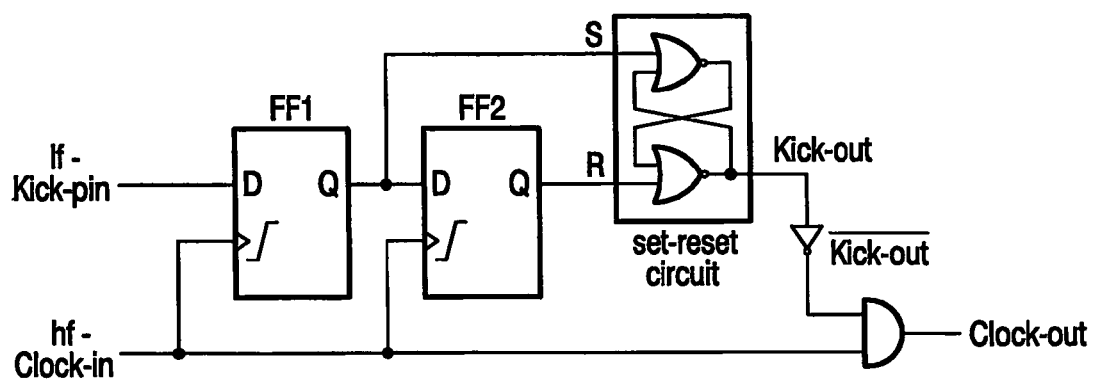
Figure 6:
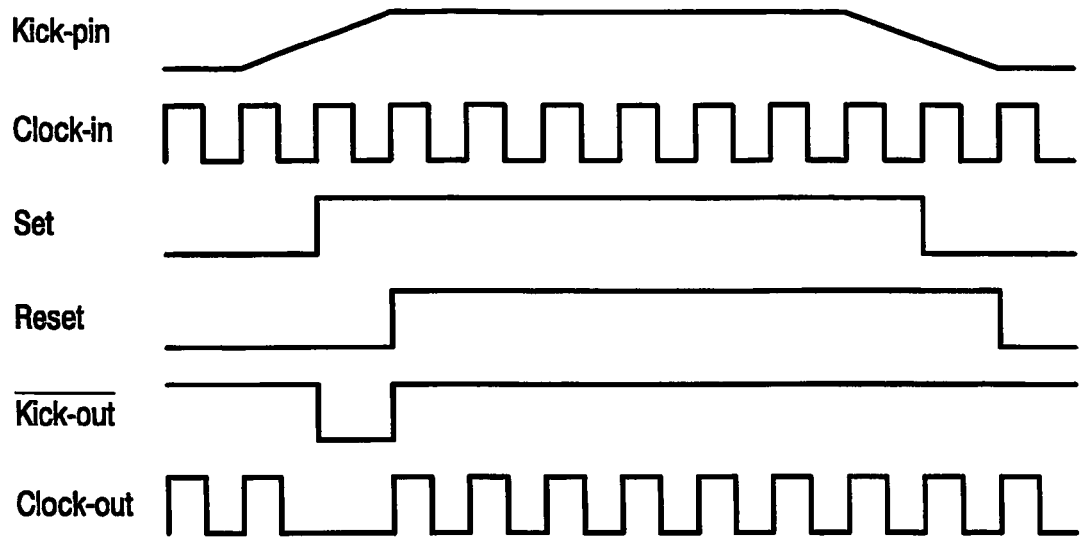
Figure 7:
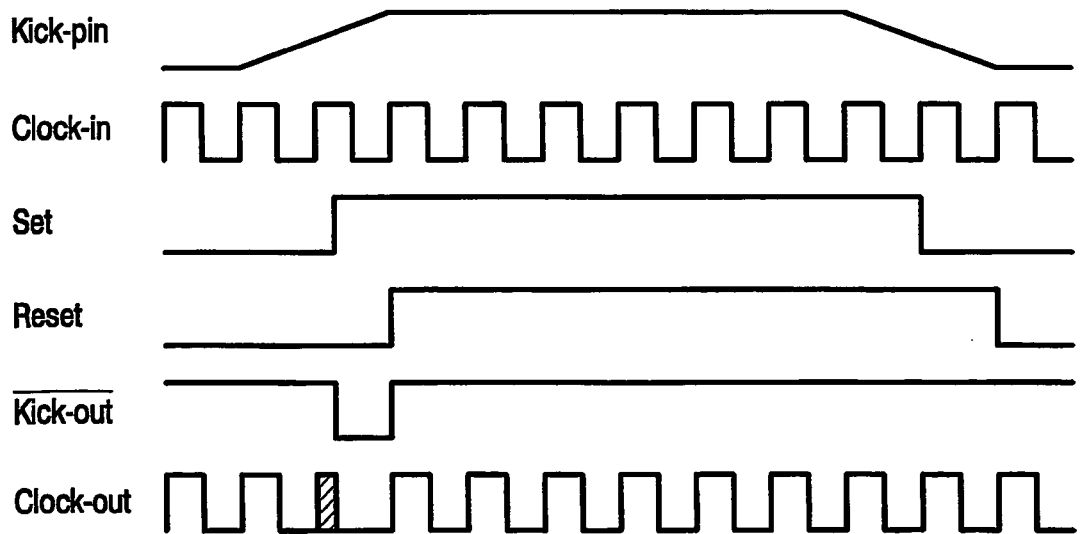
Figure 8:
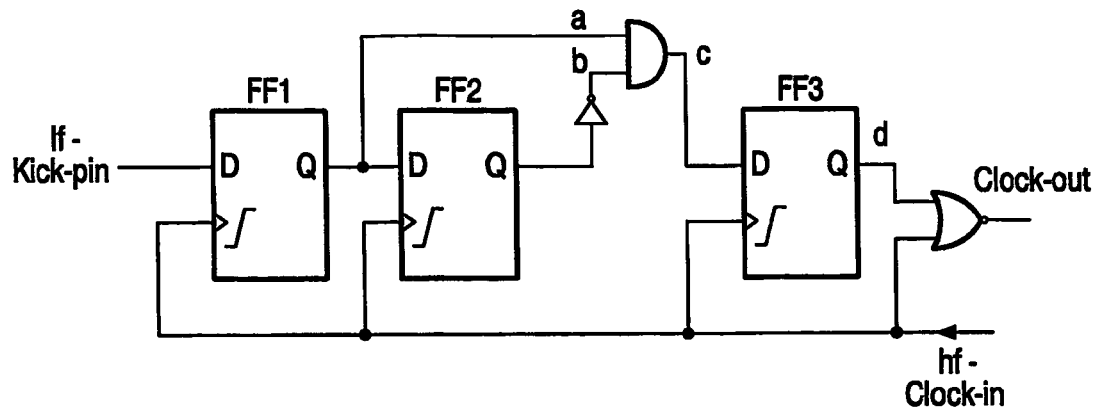
Figure 9:
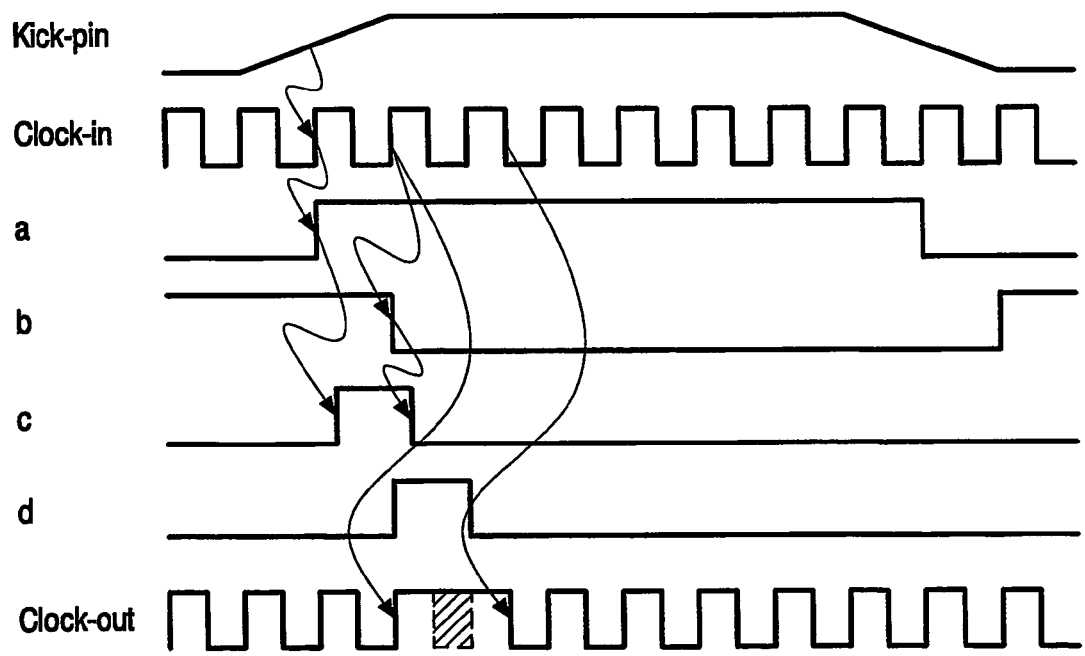

FIG. 5 a first preferred embodiment of a digital one shot circuit to be provided in the device of FIG. 4;

FIG. 6 shows waveforms of several signals used or created in the circuit of FIG. 5;

FIG. 7 shows waveforms of several signals used or created in the circuit of FIG. 5 when the Set signal occurs late with relation to the Clock-in-signal;

FIG. 8 shows a second preferred embodiment of a digital one shot circuit to be provided in the device of FIG. 4; and FIG. 9 shows waveforms of several signals to be used or created in the circuit of FIG. 8.

Figure 1:
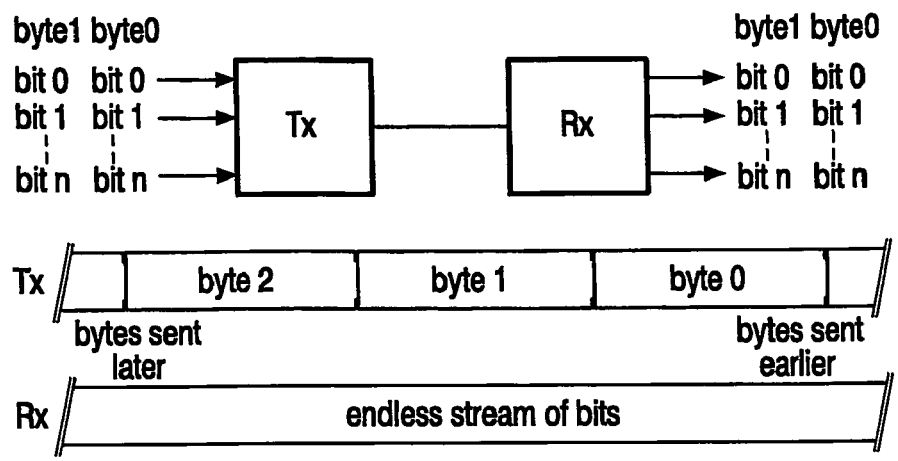
Figure 2:
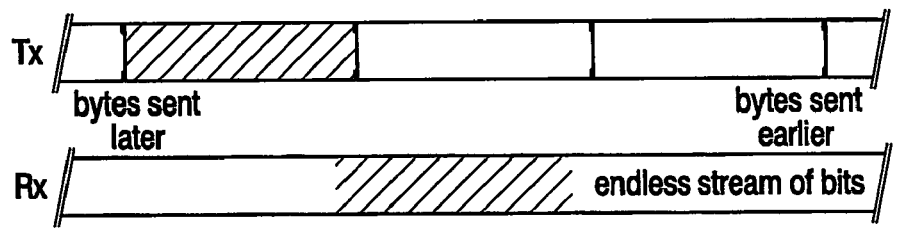

In digital data transmission systems like SDH/SONET or Gigabit Ethernet, data at the transmit side (Tx) is sent byte after byte, forming an endless stream of bits in serial order as shown in FIG. 1. A byte being a word of ones and zeroes of fixed, but unimportant, length. When this sequence of bits has to be byte demultiplexed at the receive side (Rx), it is crucial to know the position of the original bytes in this stream of bits. The transmission overhead gives the possibility to do so, by inserting one or more special byte(s) at the transmitting side, also known as frameheader bytes (SDH/SONET) or comma byte (Gigabit Ethernet), at for the receiving side unknown time moments. When this special byte is recognized in the stream of bits at the receiving side as indicated in FIG. 2, the moment of demultiplexing is known and the demultiplexed parallel output data can be aligned to the byte boundaries.

Figure 3:
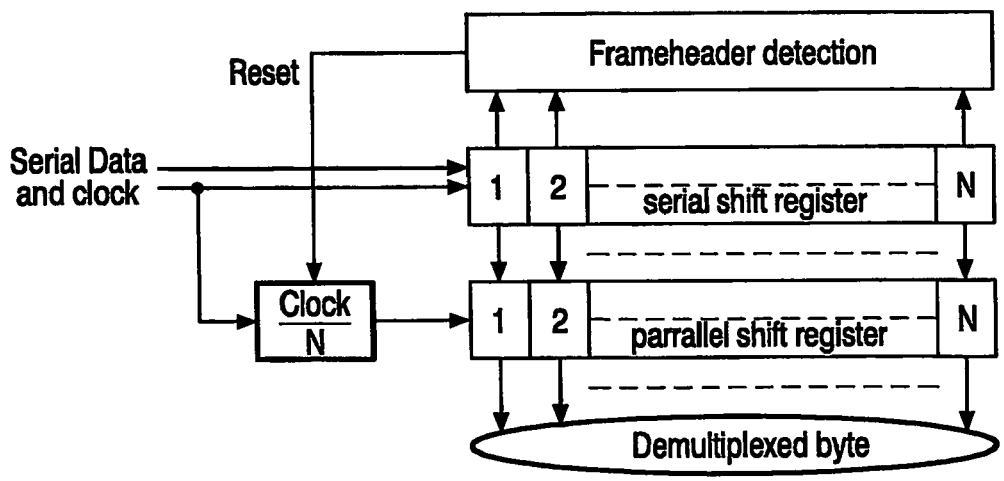
FIG. 3 shows a schematic block diagram of a conventional frame synchronizing device comprising a serial input parallel output shift register.

To be able to recognize the special byte, frameheader detection or comma byte detection is necessary and a resetable clock-divided-by-N counter must be synchronized to the frameheader byte position. A conventional frame synchronizing device including such a resetable clock-divided-by-N counter is shown in FIG. 3. This clock-divided-by-N output signal determines the moment when the demultiplexing occurs. The synchronization of this synchronous resetable clock-divided-by-N counter, when the special byte is detected, must be done at full operation speed in an exactly known time interval.

Present application proposes to use a so-called "kick-pin" principle which gives the possibility to synchronize the counter to the serial bitstream using low frequency driving signals, like CMOS. Frameheader detection can then be done at the parallel data bit rate. The counter is not reset at an exactly known time moment, but the output clock is held for one high frequency clock cycle. The result of this action is that the moment of demultiplexing of the stream of bits is shifted one bit. This can be repeated at a low frequency until synchronization/alignment has taken place. Although the driving can be operated at very low frequencies, it must be realized that synchronization will take much longer.

The demultiplexed data output is fed to a data handling device (a so-called framer circuit) which searches for the frameheader or comma byte in its inputted parallel data. If the special byte is not found within a certain time frame, it will send a signal to a kick-pin of the clock-divided-by-N counter so as to skip one clock-cycle and consequently demultiplex one bit later. This procedure will repeat until the frameheader or comma byte is detected in the output parallel data. If it is detected, the system is synchronized. When the system has reached synchronization, meaning that the demultiplexed output data are aligned to the byte boundaries, nothing happens anymore and the "kick-pin" signal will not be generated anymore. Only when synchronization is lost (e.g. due to external circumstances), the re-synchronization procedure will start over again.

The "kick-pin" signal in the device of FIG. 4 has the same role as the "Reset" signal in the device of FIG. 3, namely to adjust the time moment of demultiplexing. However, the "Reset" signal in the device of FIG. 3 occurs in the high-frequency serial time domain, whereas the "kick-pin" signal in the device of FIG. 4 is created in the lower-frequency parallel time domain. Moreover, the "Reset" signal in the device of FIG. 3 sets the demultiplexing time moment instantaneously, whereas the "kick-pin" signal shifts the demultiplexing moment one clock cycle related to the serial high-frequency clock.

So, a main advantage is that the "kick-pin" signal can be generated by circuitry in the lower frequency, less dissipating parallel clock domain or even by external sources like overall transmission system controllers.

By the way, it should be mentioned that the serial clock is expected to be already extracted and correctly aligned to the serial data.

The circuit to skip one clock cycle can be provided as a so-called digital one shot. A first preferred embodiment of such a circuit is shown in FIG. 5. The circuit can be driven by a low frequency signal, while the output skips just one high frequency clock cycle.

When the "kick-pin" signal becomes high, the Q-output of a first flip-flop FF1 will become high at the next edge of clock-in. This sets the well-known set-reset circuit (drawn here with or-gates) and kick-out will become high. The set signal is also fed to a second flip-flop FF2. The Q-output of this FF2 will then become high one clock cycle of clock-in later and consequently resets the set-reset circuit. Kick-out will go low again. Because S and R are never changing at the same time, forbidden states are impossible to occur. "AND"-ing the Kick-out signal with Clock-in gives a Clock-out signal which misses one pulse. Applying this "missing-pulse-clock-signal" to a divide-by-N counter results in a "wait" time of one clock cycle. However, it should be noted that, because the set-reset circuit has unknown start-up behavior, the first kick-pin pulse might be necessary to get the circuit in a known state. The waveforms of the signals in the circuit of FIG. 5 are shown in FIG. 6.

When using N memory elements for FF2, the digital one shot can be extended to a so-called N-shot. For N=1, the set-reset circuit is not necessary and can be replace by a single gate. This is due to a correct timing-by-construction of two flip-flops in series.

Special care must be taken to avoid clock glitches. Namely, if the Set signal occurs late with relation to the Clock-in signal, the Clock-out signal will produce a pulse, exactly where it was intended not to have a pulse. Such a situation is shown in FIG. 7.

The actual circuit for removing one clock pulse from a continuous clock sequence as applied in Pathfinder chips is given in FIG. 8 showing a second preferred embodiment of a digital one-shot circuit. The maximum operating frequency of this circuit is determined by the delay of the inverter and the AND gate and by the set-up/hold time of the flip-flops. A third flip-flop FF3 should change first, then the second flip-flop FF2 and then the first flip-flop FF1. The waveforms of the signals used or occurred in the circuit of FIG. 8 are shown in FIG. 9.

Although the invention is described above with reference to examples shown in the attached drawings, it is apparent that the invention is not restricted to it, but can vary in many ways within the scope disclosed in the attached claims.

The invention claimed is:

1. A frame synchronizing device for a binary data transmission system wherein digital data are transmitted as a serial bit stream organized into frames, each frame including a pre-defined frameheader, the device comprising:
   a serial input parallel output shift register for receiving said serial bit stream and outputting said frames in a consecutive order, said shift register including a serial input portion and a parallel output portion and having at least as many stages as the number of bits of a frame,
   first clock circuitry that generates first clock pulses, separated by a first time period, for clocking the serial input portion of the shift register;
   second clock circuitry that generates second clock pulses for clocking the parallel output portion of the shift register, the second clock circuitry generating the second clock pulses responsive to the first clock pulses, and
   control circuitry for detecting whether or not a frameheader is present at the output of said parallel output portion and, if not, controlling said shift register so that the clocking of the parallel output portion is delayed by at least the first time period, the control circuitry delaying the clocking of the parallel output portion by preventing one of the first clock pulses from reaching the second clock circuitry.

2. The device according to claim 1, wherein said control circuitry is adapted so that the preventing of one of the first clock pulses from reaching the second clock circuitry is repeated until synchronization is reached.

3. The device according to claim 1, wherein the frames have a fixed length.

4. The device according to claim 3, wherein the frames are bytes.

5. The device according to claim 1, wherein the control circuitry is adapted to control said second clock circuitry so that said second clock pulses are delayed by at least the first time period which is needed for shifting a bit in said serial input portion from a stage to a next stage.

6. The device according to claim 5, wherein each frame includes N bits, and the second clock circuitry converts said first clock pulses into said second clock pulses, the second clock pulses separated by a second time period that is N times longer than the first time period of said first clock pulses, said control circuitry is adapted to control said second clock circuitry so that said second clock pulses are delayed by at least the first time period of said first clock pulses.

7. The device according to claim 5, wherein said control circuitry is adapted to supply a control signal to said second clock circuitry to prevent the one of the first clock pulses from reaching the second clock circuitry, and said second clock circuitry is adapted so that the one of the first clock pulses is blocked by said control signal for at least the first time period which is needed for shifting a bit in said serial input portion of said shift register from a stage to a next stage.

8. A digital data transmission systems like SONET/SDH or Gigabit Ethernet comprising a device as claimed in claim 1 where serial data are transported over a single channel and, at the receiving side, is converted into parallel data for further processing.

9. A frame synchronizing method for a binary data transmission system wherein digital data are transmitted as a serial bit stream organized into frames, each frame including a pre-defined frameheader, the method comprising the steps of:

inputting said serial bit stream into a serial input portion of a serial input parallel output shift register having at least as many stages as the number of bits of a frame, generating first clock pulses, by first clock circuitry, for clocking the serial portion of the shift registers, the first clock pluses separated by a first time period generating second clock pulses, by second clock circuitry, for clocking a parallel output portion of the shift register, the second clock pulses derived from the first clock pulses, outputting said frames in a consecutive order from the parallel output portion of said shift register, detecting whether or not a frameheader is present in the output of said parallel output portion, and, if not, delaying the generation of the second clock pulses by at least the first time period by preventing one of the first clock pulses from reaching the second clock circuitry.

10. The method according to claim 9, wherein the preventing of one of the first clock pulses from reaching the second clock circuitry is repeated several times until synchronization is reached.

11. The method according to claim 9, wherein the frames have a fixed length.

12. The method according to claim 11, wherein the frames are bytes.

13. The method according to claim 9, the second clock pulses are delayed by at least the first time period which is needed for shifting a bit in said serial input portion from a stage to a next stage.

14. The method according to claim 13, comprising the further steps of:

converting said first clock pulses into said second clock pulses, the second clock pulses separated by a second time period that is N times longer than the first time period of said first clock pulses, wherein each frame includes N bits, and said second clock pulses are delayed by at least the first time period of said first clock pulses.

15. The method according to claim 13, further comprising generating a control signal if a frameheader is not detected in the output of said parallel output portion of said shift register, and blocking the generation of said second clock pulses by said control signal for at least the first time period which is needed for shifting a bit in said serial input portion of said shift register from a stage to a next stage.

* * * * *